United States Patent [19]

Brown

[11] Patent Number: 4,468,093

[45] Date of Patent: Aug. 28, 1984

[54] HYBRID SPACE/TIME INTEGRATING OPTICAL AMBIGUITY PROCESSOR

[75] Inventor: Douglas E. Brown, Columbia, Md.

[73] Assignee: The United States of America as represented by the Director of the National Security Agency, Ft. George G. Meade, Md.

[21] Appl. No.: 448,109

[22] Filed: Dec. 9, 1982

[51] Int. Cl.[3] .......................... G02B 5/18; G06G 9/00; G01S 13/58

[52] U.S. Cl. .............................. 350/162.12; 343/9 PS; 364/822

[58] Field of Search ................. 350/162.12; 343/9 PS; 364/822

[56] References Cited

U.S. PATENT DOCUMENTS 3,365,579 1/1968 Emshwiller .......................... 364/822
4,225,938 9/1980 Turpin .
4,310,894 1/1982 Lee et al. ............................ 364/822
4,389,092 6/1983 Tamura .......................... 350/162.12

OTHER PUBLICATIONS

U.S. Pat. Appl. SN 257,061, filed Apr. 24, 1981, Jonathan D. Cohen.

*Primary Examiner*—Bruce Y. Arnold
*Assistant Examiner*—William Propp
*Attorney, Agent, or Firm*—John R. Utermohle; Thomas O. Maser

[57] ABSTRACT

A hybrid space/time integrating optical ambiguity processor in which time-sequential segments of a spatially modulated optical signal are received in a two-dimensional optical modulator. The output of the optical modulator is periodically imaged along one axis and transformed along a perpendicular axis, and the result is detected for further use. Two embodiments of the two-dimensional optical modulator are described; one utilizing an electrical-to-optical transducer and one utilizing an optical-to-optical transducer.

10 Claims, 6 Drawing Figures

HYBRID SPACE/TIME INTEGRATING OPTICAL AMBIGUITY PROCESSOR

BACKGROUND OF THE INVENTION

1. Field of the Invention

My invention relates to the field of signals processing, and more specifically to integrating optical processors capable of performing correlations and similar computational functions.

2. Description of the Prior Art

Large bandwidth communications signals are routinely used to convey vast quantities of information. An important step of the information extracting process in many cases is to correlate the received signal with some other signal. For example, the auto-correlation of a received radar signal with the original transmitted signal will yield data related to the distance to some object. The cross-correlation of an unknown signal with a known standard will yield useful data on the unknown signal and its information. The effective utilization of correlation techniques for signals analysis requires rapid, and sometimes even real-time, processing. The necessary processing speeds, while often beyond the capabilities of digital computers, may be obtained by optical processors.

A common and highly effective device for imparting information in an electrical signal onto an optical beam is an acousto-optical modulator, commonly known as a Bragg cell. U.S. Pat. No. 4,225,938 to Turpin discloses a time-integrating optical processor utilizing two one-dimensional Bragg cells. An undesirable attribute of that structure is an undesirable constant level of bias in the output image. Pending patent application Ser. No. 257,061, filed Apr. 24, 1981 by Cohen, discloses a space-integrating optical processor. Applications exist which require a finer degree of frequency resolution than has been found to be possible with that structure. It is desirable to have an optical signals processor capable of overcoming the above deficiences of the prior art.

SUMMARY OF THE INVENTION

It is an object of this invention to provide a two-dimensional optical processor which overcomes certain limitations in the prior art.

A further object is to provide a structure capable of performing real-time correlations and ambiguity functions on time-varying electrical signals.

Another object is to provide an optical processor utilizing a hybrid space/time integrating scheme.

Still another object is to provide a processor output having lower levels of bias build-up.

It is also an object to provide a high frequency resolution optical processor.

An apparatus having these and other desirable features would include first means for providing a light beam; first modulating means for intensity modulating said beam with a first electrical signal f(t); second modulating means for modulating the output of said modulating means with a second electrical signal g(t) along a first spatial dimension, x; a two-dimensional optical modulator placed to receive successive outputs from said second modulating means and to transform said outputs to positions along a second spatial dimension, y; second means for providing a light beam, to illuminate said two-dimensional optical modulator; a detector; and optical means for imaging the output of said two-dimensional modulator along a first axis and transforming said output along a second axis perpendicular to said first axis, and for illuminating the detector with the resulting light beam.

THEORY OF OPERATION

Figure 1:
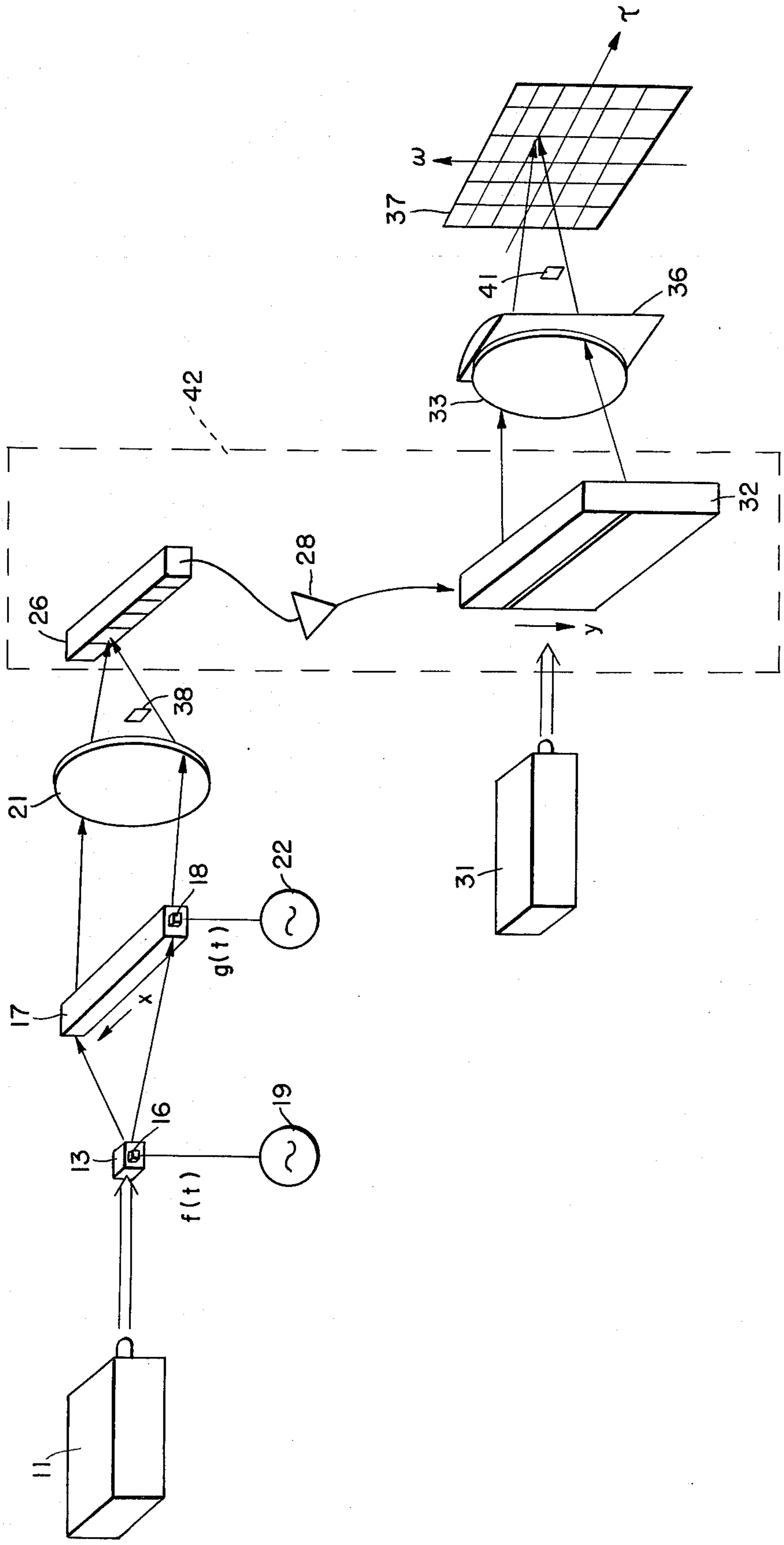
FIG. 1 illustrates a first embodiment of an optical processor according to my invention.

The function $$A(\tau,\omega) = \int_T f(t)\, g(t-\tau) e^{-j\omega t}\, dt$$

is commonly referred to as the cross-ambiguity function, and has proven to be useful for comparing two time-varying signals f and g, where one signal may be Doppler frequency shifted with respect to the other. In narrow band applications it is appropriate to approximate f and g with $$f(t)=\hat{f}(t)\cos\omega t$$

$$g(t)=\hat{g}(t)\cos(\omega+\omega_d)t$$

where $\omega_d$ is equal to $2\pi$ times the Doppler frequency and is also much smaller than $\omega$.

If a constant intensity light beam were modulated by a point light modulator driven by A+f(t), the output would be a light beam having intensity proportional to $$A+\hat{f}(t)\cos\omega t$$

(A represents a constant bias.) If this signal were then expanded linearly to illuminate an x-long acousto-optic modulator under control of g, the output of the second modulator would be proportional to $$[A+\hat{f}(t)\cos\omega t]\left[B+\hat{g}\left(t-\frac{x}{v}\right)\cos(\omega+\omega_d)\left(t-\frac{x}{v}\right)\right] \quad (2)$$

(B represents a constant bias.)

Integrating this output:

$$\int [A+\hat{f}(t)\cos\omega t]\left[B+\hat{g}\left(t-\frac{x}{v}\right)\cos(\omega+\omega_d)\left(t-\frac{x}{v}\right)\right]dt = \int\left[AB+A\hat{g}\left(t-\frac{x}{v}\right)\cos(\omega+\omega_d)\left(t-\frac{x}{v}\right)+B\hat{f}(t)\cos\omega t+\tfrac{1}{2}\hat{f}(t)\hat{g}\left(t-\frac{x}{v}\right)\cos\left\{(2\omega+\omega_d)t-(\omega+\omega_d)\frac{x}{v}\right\}+\tfrac{1}{2}\hat{f}(t)\hat{g}\left(t-\frac{x}{v}\right)\cos\left\{\omega_d t-(\omega+\omega_d)\frac{x}{v}\right\}\right]dt \quad (3)$$

Assuming that the period of integration is $\leqq \frac{1}{2}$ the period of the highest Doppler frequency to be measured (i.e., the Nyquist sampling rate), the first term of (3) is a constant, the next three terms integrate to zero, and the last term becomes $$\int_{t_i}^{t_{i+1}} \hat{f}(t)\,\hat{g}\left(t-\frac{x}{v}\right)\cos\left\{\omega_d t-(\omega+\omega_d)\frac{x}{v}\right\}dt$$

which is proportional to $$\frac{h(x)}{\omega_d}\cos[\omega_d t_1+\zeta(x)]. \qquad (4)$$

The expression h(x) in (4) represents the average value of the product $$\hat{f}(t)\,\hat{g}\left(t-\frac{x}{v}\right)$$

and $\xi$ (x) represents a phase term that does not vary with time.

When successive samples of expression (4) form the input to a two-dimensional optical modulator, successive values of $t_i$ are transformed to proportional positions along the y-axis while the x positions are preserved. Upon Fourier transforming along y, and imaging along x, one obtains $$\int \frac{h(x)}{\omega_d}\cos[\omega_d y+\zeta(x)]e^{-j\omega y}\,dy. \qquad (5)$$

This result shows up as an output whose x coordinate occurs where f and g correlate and whose y coordinate is proportional to $\omega_d$.

DESCRIPTION OF THE PREFERRED EMBODIMENTS

FIG. 1 illustrates a first embodiment of an optical ambiguity function processor embodying the concepts of my invention. A beam of light from a source 11 passes through a first acousto-optic modulator 13, a second acouto-optic modulator 17, and a spherical lens 21. A transducer 16 connects a first electrical signal source 19 to modulator 13 and a transducer 18 connects a second electrical signal source 22 to modulator 17. The light beam which leaves lens 21 illuminates a one-dimensional detector array 26. An electrical signal from array 26 passes through amplifier 28 to a two-dimensional electrical-to-optical transducer 32. Incident collimated light from a second source 31 passes through transducer 32 and lenses 33 and 36 to a two-dimensional detector array 37.

Figure 3:
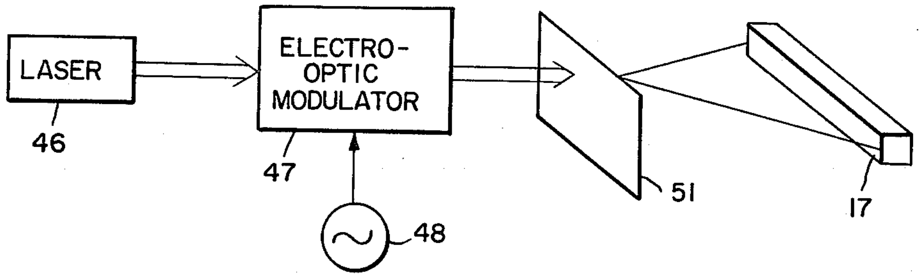
FIGS. 3 and 4 illustrate alternative structures for providing the first modulated light signal of the optical processor.

For the purpose of explanation, the apparatus of FIG. 1 may be considered to perform three complex operations in sequence, including (1) a one-dimensional time integrating correlation; (2) a modulation; and (3) a transformation/imaging operation. The correlation, which may incorporate either coherent or non-coherent light, is performed by the modulators 13 and 17, the lens 21, and the detector array 26. This is suggested as a preferred embodiment; however, it should be understood that any of several one-dimensional time integrating architectures would be suitable. Specific alternatives are illustrated in FIGS. 3 and 4.

A signal f(t) provided to transducer 16 of FIG. 1 causes an acoustic wave to propagate across modulator 13. Light of constant intensity from source 11 which passes through the modulator is diffracted by the propagating wave such that the intensity of the light exiting from the modulator is proportional to the term in (1) above. In a similar manner, a signal g(t) from source 22 is provided to transducer 18 to cause an acoustic wave to propagate through modulator 17. Light incident on the front face of modulator 17 is diffracted to create an output having an intensity proportional to g(t−x/v), where x is the distance the wave has propagated at time t and v is the acoustic propagation velocity of cell 17. The combined effect on the original light beam from source 11 is to create a beam incident on lens 21 having an intensity proportional to the term in (2) above. Lens 21 is positioned such that it images cell 17 onto array 26. A stop 38 eliminates the zero order component of the beam before it reaches detector array 26. A time-varying electrical signal representing the integrated product in (4) above is produced by the array circuitry and is passed to an electrical-to-optical transducer 32 such as a conventional coherent light valve. The two-dimensional face of the light valve is filled in a raster format with successive rows of output from detector array 26. The sampling rate of array 26 must be such that the highest offset frequency to be measured is sampled at least twice per cycle (the Nyquist rate). Obviously, the raster scan of the light valve must be synchronized with readout of the array 26. Source 31 provides a beam of coherent light which is modulated as it passes through light valve 32. The cumulative effect of the one-dimensional detector 26 and the light valve 32 is that of a two-dimensional optical-to-optical modulator 42.

The transform/imaging operation is performed by a spherical lens 33 and a cylindrical lens 36 in combination. A two-dimensional detector 37 is positioned one focal length behind the spherical lens in the Fourier transform plane. At that plane, and in the direction the cylindrical lens has no power, the spherical lens forms the Fourier transform of the beam modulated by light valve 32. The cylindrical lens is chosen such that, in combination with the spherical lens, it will image the modulated beam along the perpendicular axis. The lens pair must be oriented such that the imaging, or time, axis is along the direction of the one-dimensional correlation, while the transform, or frequency, axis is perpendicular. A stop 41 is preferably placed to intercept the zero order component of the beam, with only higher orders reaching detector 37. The result is an optical image on detector 37 which represents the term in (5) above.

Figure 2:
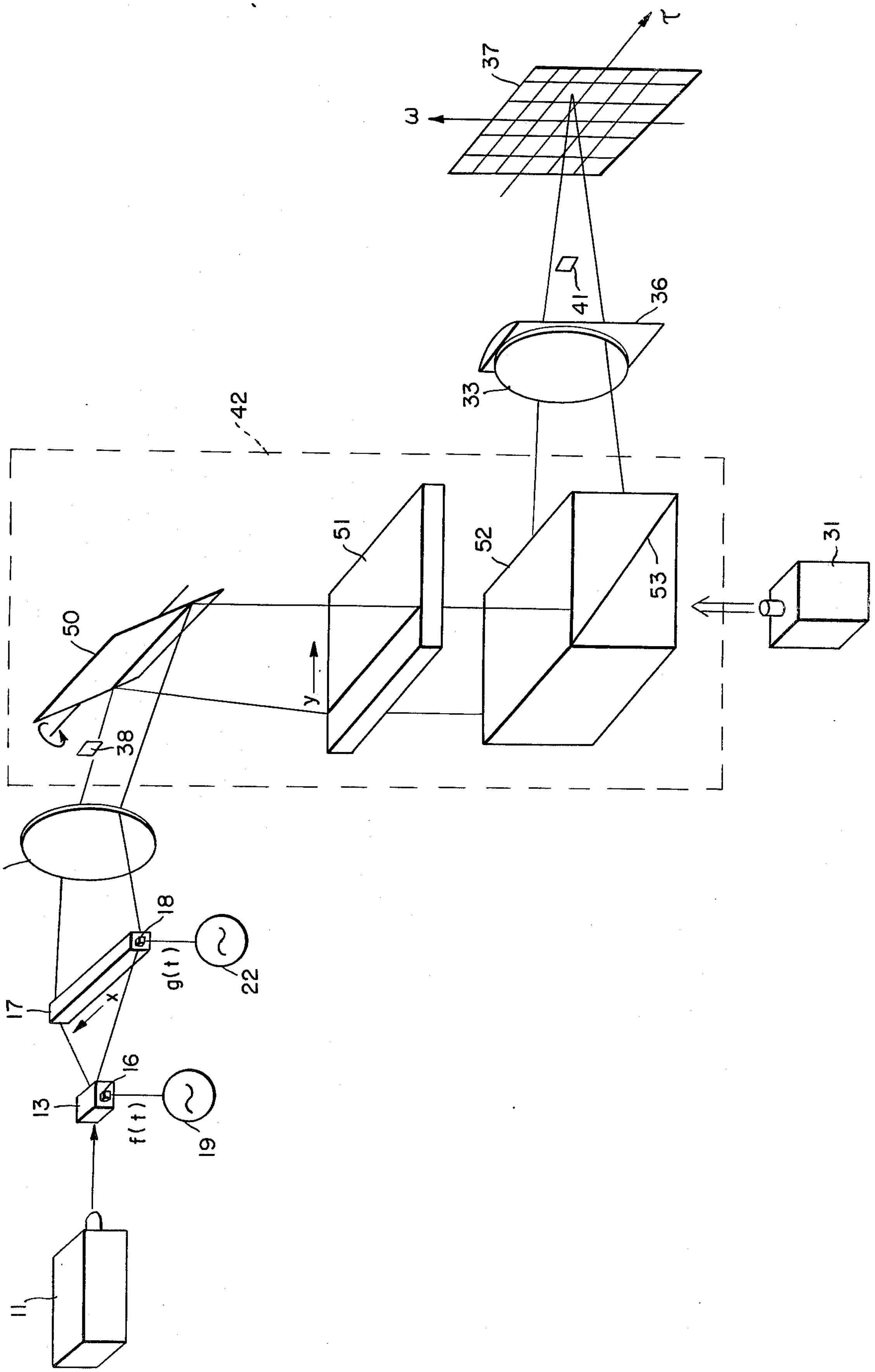
FIG. 2 illustrates a second embodiment of an optical processor according to my invention.

In a second embodiment of my invention, illustrated in FIG. 2, the modulator 42 includes an optical-to-optical transducer 51 which both reads out the correlation and directly modulates the beam from source 31. This approach is advantageous in that it eliminates the need for optical-to-electrical-to-optical conversions. A rotating scanning mirror 50 scans the one-dimensional modulation across the face of the transducer 51. A beam from light source 31 is passed through a beam splitter 52 to illuminate the lower face of transducer 51. The resulting optical signal is reflected by mirror 53 into the transform/imaging optics.

The one-dimensional time integrating correlator operates exactly as was described earlier with respect to the first embodiment to provide a Fourier transform on the horizontally diverging light beam emerging from lens 21. Scanning mirror 50 is illuminated by the beam and reflects one row of information onto optical-to-optical transducer 51. As mirror 50 rotates it reflects succeeding rows of information onto transducer 51 until the entire two-dimensional grid is filled. At that time, the grid illuminates beam splitter 52 for reflection through lenses 33 and 36 onto detector 37.

Figure 4A:
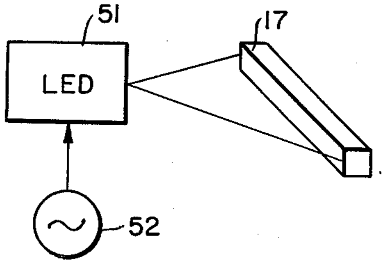
Figure 4B:
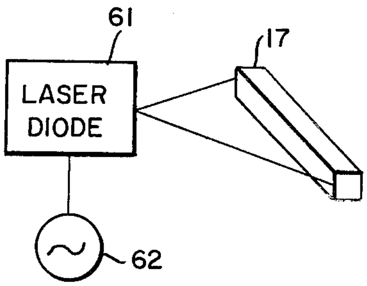

FIGS. 3 and 4 illustrate alternative structures for providing the first modulated light signal of my invention. In FIG. 3, a laser 46 illuminates a conventional electro-optical modulator 47. An electrical signal source 48 is connected to the electro-optical modulator 47. A polarizing filter 51 is placed in the beam path between modulator 47 and the second modulator 17 (of FIGS. 1 or 2). The signal from source 48 modulates the light beam from laser 46 as it passes through modulator 47 by varying the polarization of the laser beam. The polarizing filter 51 causes an intensity modulation of the beam which is then focused onto the second modulator 17. FIG. 4*a* illustrates a conventional light emitting diode 51 whose output is modulated by signals provided by a source 52. The modulated output is focused (by conventional optics which are not illustrated) onto the second modulator 17. FIG. 4*b* illustrates a similar structure in which a laser diode 61 provides an output, modulated by signal source 62, which is focused onto the second modulator 17.

Figure 5:
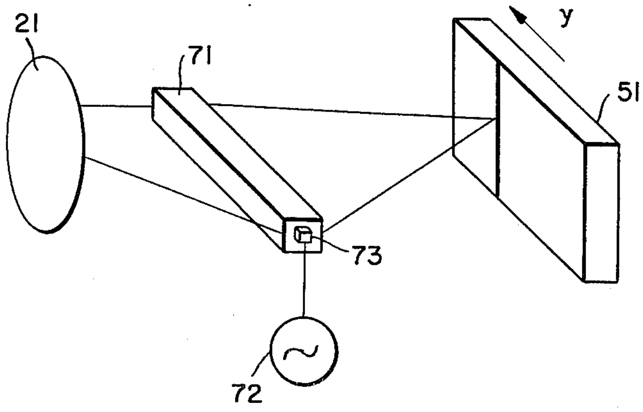
FIG. 5 illustrates an alternative structure for the scanning mirror of the optical processor.

FIG. 5 shows an alternative structure for the scanning mirror 50 of FIG. 2. In this embodiment the mirror 21 focuses the beam onto an acousto-optic deflector 71. The deflection angle is determined by an electrical signal from a source 72 through a transducer 73 connected to the deflector. This deflected beam is scanned across the face of transducer 51 as previously described.

It is to be understood that my invention may be implemented in a number of embodiments in addition to those specifically described. The examples are presented as illustrative and are not intended to limit my invention except to the extent set forth in the claims which follow.

I claim:

1. An optical processing apparatus, comprising:

first means for providing a light beam;

first modulating means for intensity modulating said beam with a first electrical signal f(t);

second modulating means for modulating the output of said modulating means with a second electrical signal g(t) along a first spatial dimension, x;

a two-dimensional optical modulator placed to receive successive outputs from said second modulating means and to transform said outputs to positions along a second spatial dimension, y;

second means for providing a light beam to illuminate said two-dimensional optical modulator;

a detector; and optical means for imaging the output of said two-dimensional modulator along a first axis and transforming said output along a second axis perpendicular to said first axis, and for illuminating the detector with the resulting light beam.

2. The apparatus of claim 1 wherein said second modulating means is an acousto-optic modulator.

3. The apparatus of claim 2 wherein said two-dimensional optical modulator comprises:

a one-dimensional detector array positioned to receive signals from said second modulating means, and a two-dimensional electrical-to-optical transducer configured to sequentially receive and store signals from said array.

4. The apparatus of claim 2 wherein said two-dimensional optical modulator comprises:

an optical-to-optical transducer;

means for scanning the output of said second modulator across the face of said transducer, and means for combining the output of said transducer with the output of said second light source.

5. The apparatus of claim 4 wherein said scanning means is a rotating mirror.

6. The apparatus of claim 4 wherein said scanning means is an acousto-optic deflector.

7. The apparatus of claim 3 or 4 wherein said first modulating means is an acousto-optic modulator.

8. The apparatus of claim 3 or 4 wherein said first modulating means is an electro-optic modulator.

9. The apparatus of claim 3 or 4 wherein said first means for providing a light beam is a laser diode.

10. The apparatus of claim 3 or 4 wherein said first means for providing a light beam is a light-emitting diode.

* * * * *